(No Model.)
A. HAGAR & A. J. AMICK.
ANIMAL TRAP.
No. 507,000.          Patented Oct. 17, 1893.
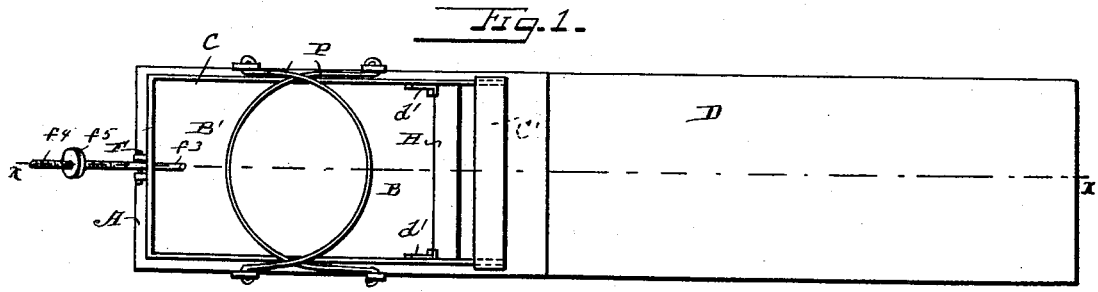
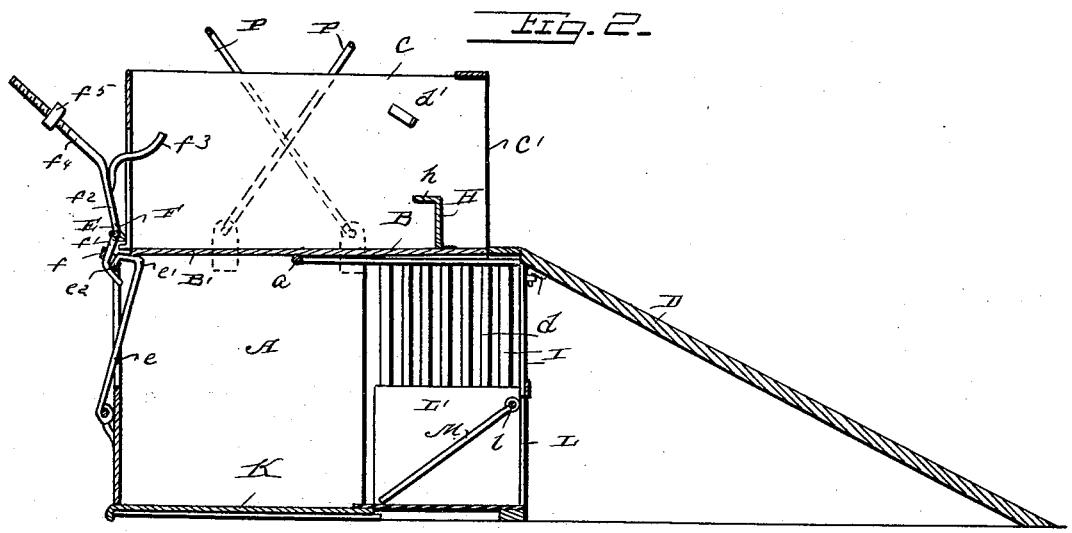

UNITED STATES PATENT OFFICE.

ABRAHAM HAGAR AND ANDREW J. AMICK, OF BOONESBOROUGH, MISSOURI.

ANIMAL-TRAP.

SPECIFICATION forming part of Letters Patent No. 507,000, dated October 17, 1893.

Application filed June 14, 1893. Serial No. 477,589. (No model.)

*To all whom it may concern:*

Be it known that we, ABRAHAM HAGAR and ANDREW J. AMICK, citizens of the United States, and residents of Boonesborough, in the county of Howard and State of Missouri, have invented certain new and useful Improvements in Animal-Traps; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view of the trap and Fig. 2 is a vertical section on line $x.x$.

This invention has relation to certain new and useful improvements in animal traps, and is designed to provide a simple and effective device possessing certain novel features of construction and combinations of parts, all as hereinafter described and pointed out in the claims.

Referring to the accompanying drawings, the letter A designates a box or closure, designed to be of any suitable size and form. The top portion of this box or closure consists mainly of a trap-door B, pivoted upon a transverse rod $a$, and so balanced as to normally lie in horizontal position but which will readily swing upon said rod so as to precipitate its rear end B' downwardly into the box or closure. This trap or door B also forms the bottom of a run-way C having closed sides and rear end, but open at the front end C' through which the animal enters, after running up an inclined board D attached by hooks $d, d$, or by other suitable means to the front end of the box or closure.

The trap or door B is normally prevented from falling into the box or closure by means of a trigger device E, consisting of a rod or wire pivoted to the rear end of the box, and projecting through a slot $e$ therein, into such position that its bent upper portion $e'$ normally forms a support for the rear end of the said door or trap. Said bent portion $e'$ projects outwardly through said slot, and terminates in a hook $e^2$ which loosely engages an eye $f$ on an arm $f'$ of a bait-carrying device now to be described. Said device consists of a rocking arm F having loose bearings in lugs on the upper rear edge of the box or closure, and carrying the depending arm $f'$ above referred to, and an upwardly projecting forked arm $f^2$, one fork $f^3$ of which projects through a slot into the run-way while the other fork $f^4$ extends in the opposite direction, and carries an adjustable weight $f^5$. The bait is attached to the fork $f^3$ and the weight $f^5$ is adjusted upon the other fork to such a position as will enable it to counterbalance the weight of the bait, and thereby prevent the arm F from rocking forwardly and withdrawing the trigger from under the trap or door. As soon as the animal nibbles at the bait, it draws the fork $f^3$ forwardly, rocking the arm F, which, through the arm $f'$, withdraws the trigger from underneath the door or trap, which falls, and precipitates the animal into the box or closure, the door as soon as released of the weight, returning to its normal position and ready for a second animal.

The door is prevented from going beyond the desired point by the stops $d'$. On the upper face of the door or trap, near the forward end thereof is placed a vertical barrier plate H, the upper edge of which is turned rearwardly, as shown at $h$, so that while the animal will readily leap is from the entering side, when once over, it will be more difficult for it to get back.

A portion of the box or closure may be of grating, as shown at I, through which the interior may be readily observed. The rear bottom portion underneath the rear portion of the trap or door may have a sliding door K, which may be withdrawn in case it is desired to set the trap over a can, bucket, barrel, or pit.

In the front end of the box or closure is an opening L the sides L' of which extend inwardly some distance. This opening is protected by a door M, which may be formed, as shown of wire rods. Said door is swung by a rod $l$, and is inclined downwardly and rearwardly from its upper end, the rear end resting on the bottom of the passageway between the side plate L'. This door it will be apparent, will not afford egress to the animals from the inside, unless it is raised for that purpose but should an animal at the outside be attracted by the animals inside, it can readily enter, and thus be entrapped.

The trap is designed to be made in different sizes and is intended for all classes of animals which it may be desired to entrap, from a mouse up. Handles P may be provided if desired.

Having described this invention, what we claim as new, and desire to secure by Letters Patent, is—

1. In an animal trap, the box or closure, the run-way thereon, the trap door forming the bottom of said run-way, the barrier plate H across said run-way, the pivoted rod or wire E pivoted to the rear portion of the box and projecting through a slot therein into position to normally support said trap door, the bait carrying device having the rocking arm F, depending arm $f'$ loosely engaging an eye on the rod or wire E, and forked arm $f^2$, one fork of which projects into the run-way, the other fork having an adjustable counterbalancing weight, substantially as specified.

2. In an animal trap, the box or receptacle, a trap door in the upper wall thereof, the bait holding and trigger devices, a grating forming part of the side walls of said box, a slide in the bottom thereof, the opening L in the front end of said box, said opening having its side walls extending inwardly some distance into said box, and a swinging inclined gravity door M within the box and preventing egress through said opening, substantially as specified.

In testimony whereof we affix our signatures in presence of two witnesses.

A. HAGAR.
A. J. AMICK.

Witnesses:
DANIEL GESSLEY,
S. H. KIVETT.